(12) United States Patent
Lanfant et al.

(10) Patent No.: US 12,485,631 B2
(45) Date of Patent: Dec. 2, 2025

(54) METHOD FOR MANUFACTURING A VANE COMPRISING A REINFORCED CAVITY

(71) Applicant: SAFRAN, Paris (FR)

(72) Inventors: Nicolas Pierre Lanfant, Moissy-Cramayel (FR); Bastien Tranquart, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/702,230

(22) PCT Filed: Oct. 14, 2022

(86) PCT No.: PCT/FR2022/051943
§ 371 (c)(1),
(2) Date: Apr. 17, 2024

(87) PCT Pub. No.: WO2023/067270
PCT Pub. Date: Apr. 27, 2023

(65) Prior Publication Data
US 2024/0326358 A1    Oct. 3, 2024

(30) Foreign Application Priority Data

Oct. 20, 2021    (FR) ........................ 2111144

(51) Int. Cl.
*B29C 70/68*    (2006.01)
*B29C 70/48*    (2006.01)
(Continued)

(52) U.S. Cl.
CPC ............ *B29C 70/682* (2013.01); *B29C 70/48* (2013.01); *B29C 70/865* (2013.01); *B29L 2031/08* (2013.01)

(58) Field of Classification Search
CPC ..... B29C 70/345; B29C 70/48; B29C 70/688; B29C 70/682
See application file for complete search history.

(56) References Cited

U.S. PATENT DOCUMENTS 4,935,277 A * 6/1990 Le Balc'h ............. B64C 27/473
428/116
5,156,786 A * 10/1992 Monroe ................ B29C 70/446
264/258
(Continued)

FOREIGN PATENT DOCUMENTS

CN        102666277 A    9/2012
CN        106794641 A    5/2017
(Continued)

OTHER PUBLICATIONS

Messler, Jr., R.W., S. Genc, Integral Micro-Mechanical Interlock (IMMI) Joints for Polymer-Matrix Composite Structures, Journal of Thermoplastic Composite Materials, vol. 11 (May 1998), pp. 200-215. (Year: 1998).*

(Continued)

*Primary Examiner* — Matthew J Daniels
(74) *Attorney, Agent, or Firm* — Pillsbury Winthrop Shaw Pittman LLP

(57) ABSTRACT

A method for manufacturing a turbomachine vane made of composite material and having a cavity, the method includes producing a core having the shape of the cavity of the vane to be manufactured, the core including a reinforcing structure occupying only a portion of the volume of the core, the core further including a sealed envelope defining the outer surface of said core; and forming a composite material skin around the core.

8 Claims, 6 Drawing Sheets

(51) Int. Cl.
*B29C 70/86* (2006.01)
*B29L 31/08* (2006.01)

(56) References Cited

U.S. PATENT DOCUMENTS

| | | | | |
|---|---|---|---|---|
| 5,279,892 A | * | 1/1994 | Baldwin | B29C 70/08 |
| | | | | 442/281 |
| 2011/0142670 A1 | | 6/2011 | Pilpel et al. | |
| 2013/0017093 A1 | * | 1/2013 | Coupe | B29C 70/72 |
| | | | | 416/230 |
| 2015/0040396 A1 | | 2/2015 | Fremont et al. | |
| 2019/0077111 A1 | * | 3/2019 | Robrecht | B32B 7/12 |
| 2019/0195073 A1 | * | 6/2019 | Sakala | B29C 70/70 |
| 2021/0079798 A1 | | 3/2021 | Backhouse et al. | |
| 2021/0221071 A1 | * | 7/2021 | Hatta | B29C 70/34 |
| 2023/0211563 A1 | * | 7/2023 | Enserink | B29C 66/7292 |
| | | | | 156/308.4 |

FOREIGN PATENT DOCUMENTS

| | | |
|---|---|---|
| CN | 110612392 A | 12/2019 |
| FR | FR 2 559 422 A1 | 8/1985 |
| WO | WO 2015/017001 A1 | 2/2015 |
| WO | WO 2021/123652 A1 | 6/2021 |
| WO | WO 2021/160961 A1 | 8/2021 |

OTHER PUBLICATIONS

Written Opinion of the International Searching Authority as issued in International Patent Application No. PCT/FR2022/051943, dated Jan. 18, 2023.

International Search Report as issued in International Patent Application No. PCT/FR2022/051943, dated Jan. 18, 2023.

First Office Action as issued in Chinese Patent Application No. 202280070859.2, dated Jul. 30, 2024.

* cited by examiner

[Fig. 1]
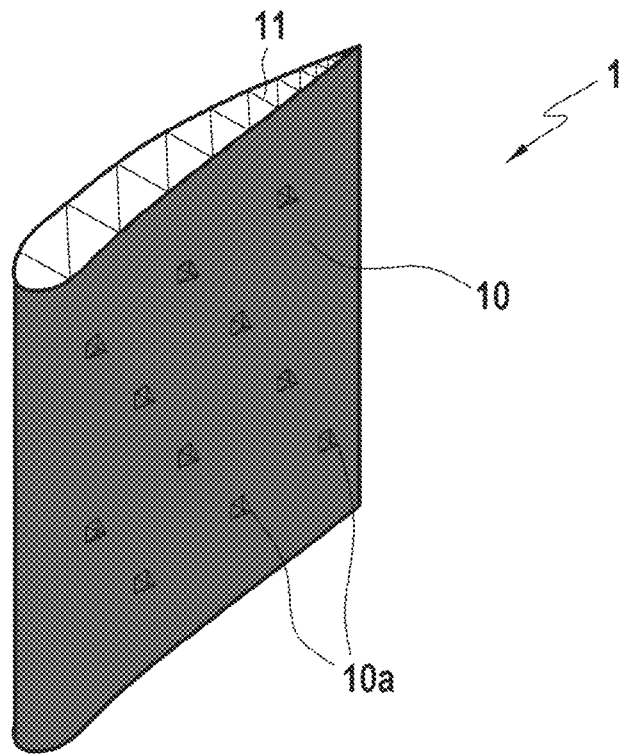
[Fig. 2]
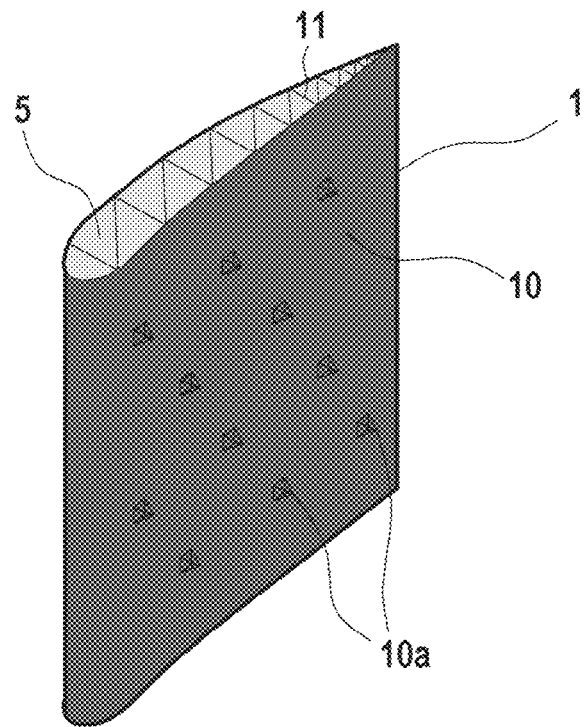

[Fig. 3]
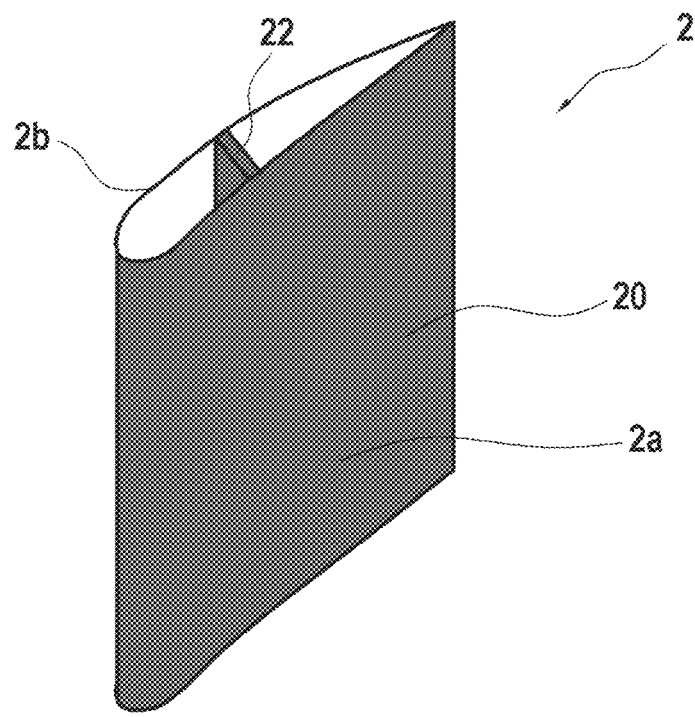
[Fig. 4]
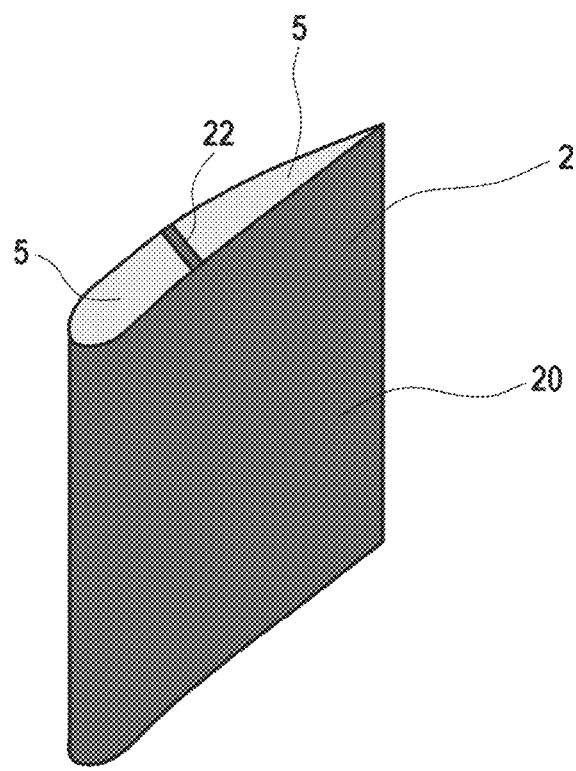

[Fig. 5]
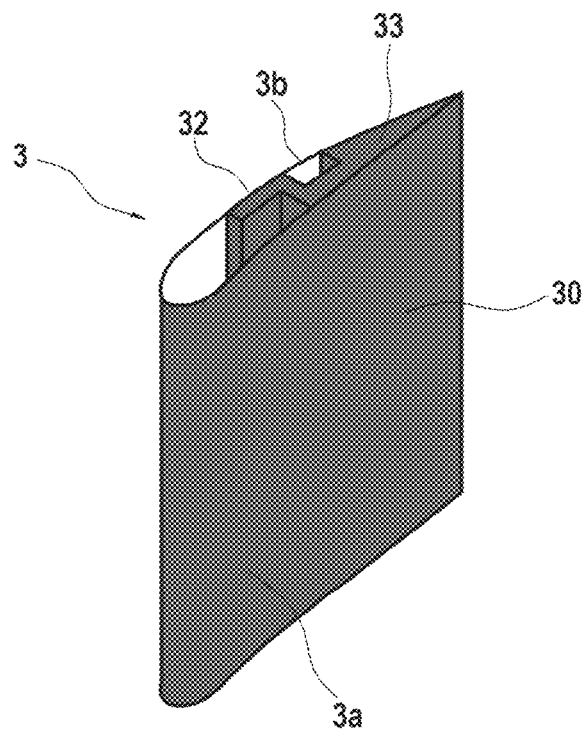
[Fig. 6]
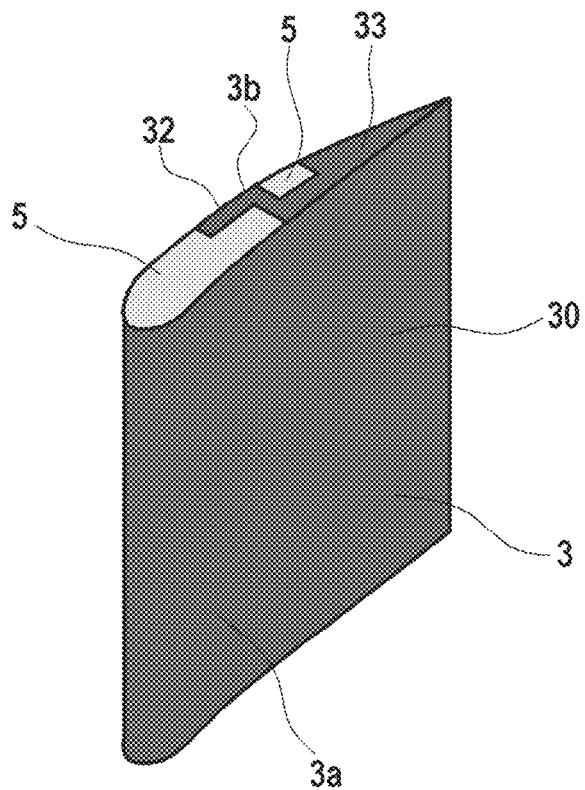

[Fig. 7]
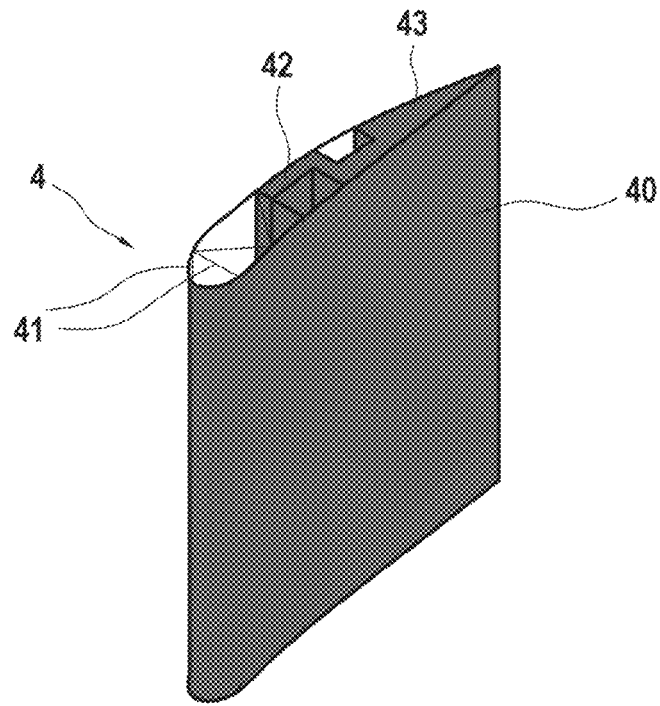
[Fig. 8]
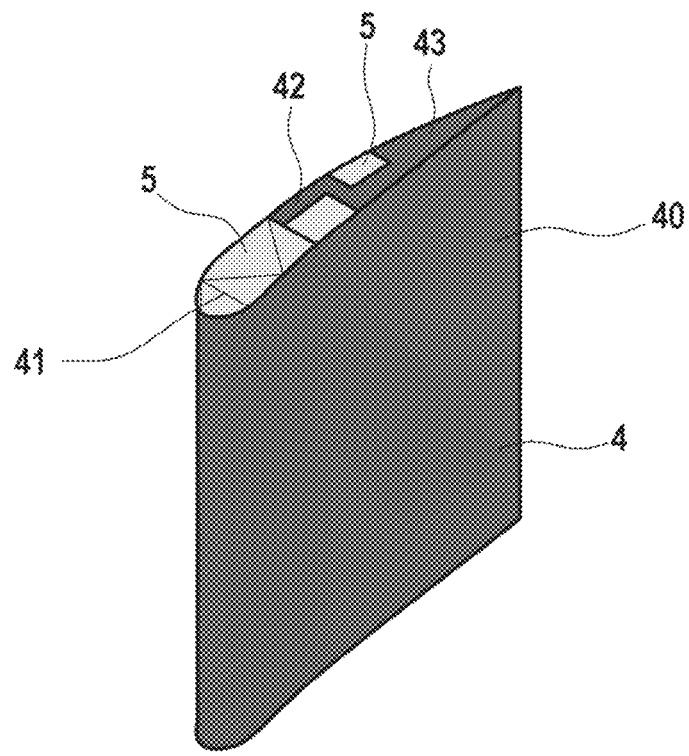

[Fig. 9]
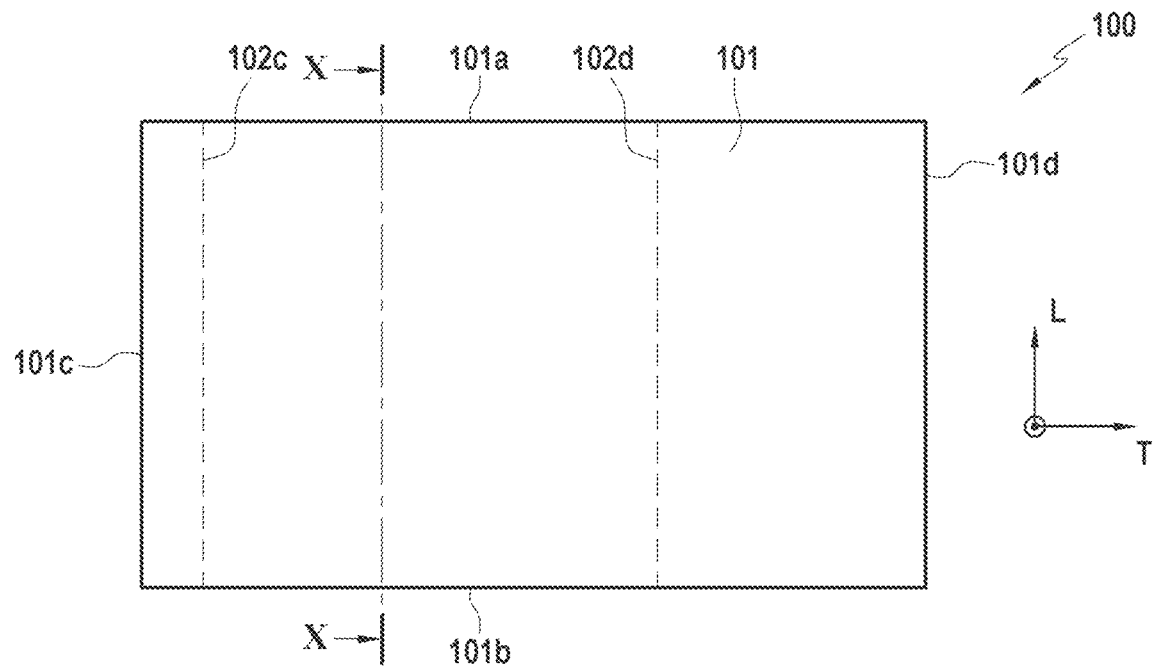
[Fig. 10]
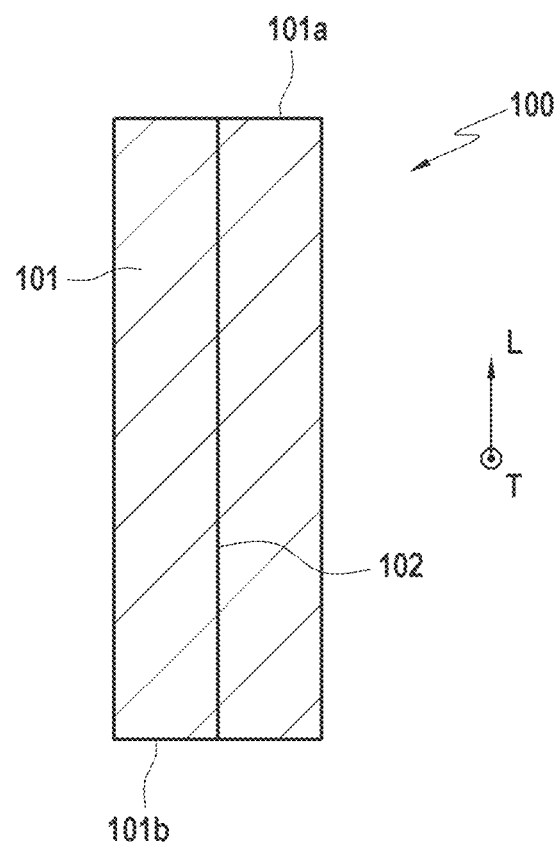

[Fig. 11]
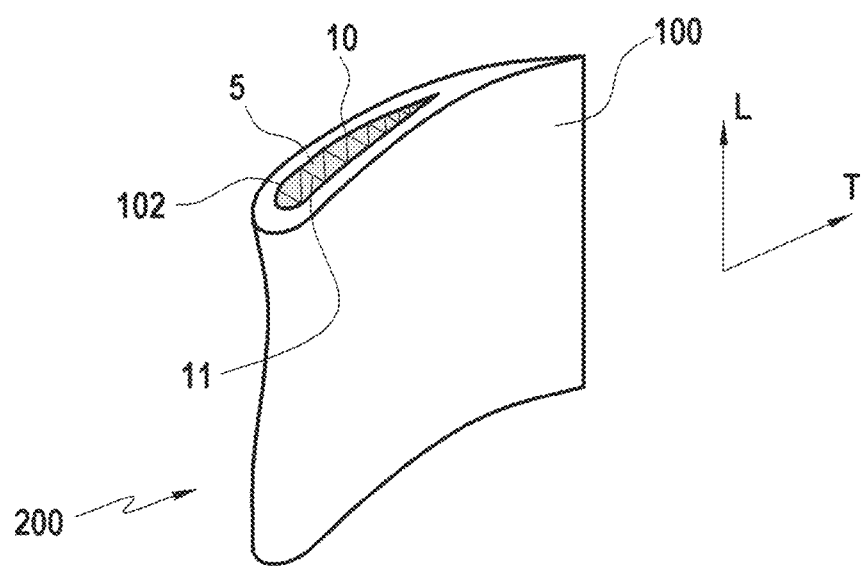

METHOD FOR MANUFACTURING A VANE COMPRISING A REINFORCED CAVITY

CROSS-REFERENCE TO RELATED APPLICATIONS

This application is the U.S. National Stage of PCT/FR2022/051943, filed Oct. 14, 2022, which in turn claims priority to French patent application number 2111144 filed Oct. 20, 2021. The content of these applications are incorporated herein by reference in their entireties.

TECHNICAL FIELD

The present invention relates to the general field of vanes, propellers or blading made of composite material having an internal cavity.

PRIOR ART in the field of aircraft engines, the turbine engine vanes can be made of composite material in order to acquire a strength equivalent to or greater than that of metal, but with a lower overall mass. Indeed, the improvement in performance of the turbine engine, in particular with respect to consumption, requires a reduction in mass.

In the case of composite material vanes obtained by three-dimensional weaving, the composite material located in the core of the vane only has a small influence on the mechanical performance of the part, whereas it can account for a non-negligible part of the mass of the vane. Hence, it is advantageous to manufacture hollow vanes, comprising a composite material skin obtained by three-dimensional weaving. Such a manufacturing method is described, for example, in document US2015040396A1.

However, the presence of a cavity inside the vane can be detrimental, particularly in the case of a long vane and a large-sized cavity. More specifically, in this case, thin composite material skins of the vane have low natural modes of vibration which are close to the natural modes of the engine in operation. Hence, the thin composite material skins can begin to vibrate, or even enter resonance.

In addition, the presence of a large-sized cavity inside the vane reduces the resistance to torsion and to aerodynamic forces.

DISCLOSURE OF THE INVENTION

The object of the present invention is to provide a solution which enables turbine engine vanes made of composite material having a reinforced internal cavity to be produced, overcoming the above-mentioned disadvantages.

For this purpose, the invention proposes a method for manufacturing a turbomachine vane made of composite material and having a cavity, said method comprising at least:
  producing a core having the shape of the cavity of the vane to be manufactured, said core comprising a reinforcing structure occupying only a portion of the volume of the core, the core further comprising a sealed envelope defining the outer surface of said core; and
  forming a composite material skin around the core.

Hence, in a similar manner to the first manufacturing method presented, the cavity of the vane obtained is reinforced by a reinforcing structure, giving the vane a better mechanical strength and reducing the risk of vibration of the skins. By occupying a limited volume of the cavity of the vane, the reinforcing structure does not add too large a mass to the vane. The use of an envelope defining the outer surface of the core can allow the use of a partially hollow and lightweight core, while avoiding any risk of migration of the resin that is used to form the skins, towards the inside of the core.

According to a particular feature of the invention, the volume of the remainder of the core comprises an elastomer material, so as to obtain a composite material vane having a cavity occupied by the elastomer material and the reinforcing structure.

Hence, it is possible to obtain a vane, the cavity of which is reinforced by the reinforcing structure and occupied by an elastomer material. The presence of the elastomer material inside the vane enables damping of the mechanical stresses, while remaining substantially lighter than the composite material.

According to another particular feature of the invention, the reinforcing structure has, at least in part, a lattice structure.

According to another particular feature of the invention, the reinforcing structure comprises at least one support element joining two opposing inner walls of the envelope.

This support element can, for example, take the form of a shell, a plate or a solid body. On the final vane, these support elements can simultaneously support the two skins forming the intrados and extrados of the vane, so as to increase the mechanical strength of the vane and limit the risk of vibration of the skins.

According to another particular feature of the invention, the support element is positioned at one or more anti-nodes of the natural modes of vibration of the walls of the cavity.

By placing one or more support elements at the anti-nodes of the natural modes of vibration, it is possible to effectively reinforce the cavity of the vane or of the blading with smaller and more lightweight support elements.

According to another particular feature of the invention, the support element is a solid body matching the internal shape of a portion of the envelope.

According to another particular feature of the invention, the envelope comprises protuberances projecting towards the outside of the core.

These projecting protuberances ensure a better mechanical connection between the reinforcing structure and the composite material skin of the vane.

According to another particular feature of the invention, the composite material skin is produced by injecting a matrix precursor resin into a fibrous preform covering the core, the method further comprising the treatment of said resin in order to obtain a skin comprising a fibrous reinforcement densified by said matrix.

According to another particular feature of the invention, the fibrous preform is produced by inserting the core into a separating area of a fibrous blank produced in a single piece by three-dimensional weaving of yarns.

According to another particular feature of the invention, the fibrous preform is obtained by layup of fibrous strata around the core.

According to another particular feature of the invention, the composite material skin is produced by layup of fibrous strata pre-impregnated with a matrix precursor resin around the core, the method further comprising the treatment of said resin in order to obtain a skin comprising a fibrous reinforcement densified by said matrix.

BRIEF DESCRIPTION OF THE FIGURES

FIG. 1 is a schematic three-dimensional view of an envelope and a reinforcing lattice structure, in accordance with the invention.

FIG. 2 is a schematic three-dimensional view of a core in accordance with the invention, comprising the envelope and the reinforcing structure of the FIG. 1.

FIG. 3 is a schematic three-dimensional view of an envelope and of a reinforcing structure comprising a shell, in accordance with the invention.

FIG. 4 is a schematic three-dimensional view of a core in accordance with the invention, comprising the envelope and the reinforcing structure of the FIG. 3.

FIG. 5 is a schematic three-dimensional view of an envelope and a reinforcing structure comprising a shell and a solid body, in accordance with the invention.

FIG. 6 is a schematic three-dimensional view of a core in accordance with the invention, comprising the envelope and the reinforcing structure of FIG. 5.

FIG. 7 is a schematic three-dimensional view of an envelope and a reinforcing structure including a lattice, a shell and a solid body, in accordance with the invention.

FIG. 8 is a schematic three-dimensional view of a core in accordance with the invention, comprising the envelope and the reinforcing structure of FIG. 7.

FIG. 9 is a schematic plan view of a woven fibrous blank intended for the production of a vane by RTM injection, in accordance with an embodiment of the invention.

FIG. 10 is a sectional view of the fibrous blank of FIG. 9.

FIG. 11 is a schematic view of a fibrous preform produced by inserting a core according to the invention into the fibrous blank of FIGS. 9 and 10.

DESCRIPTION OF THE EMBODIMENTS

The invention applies, in a general manner, to various types of composite material parts comprising an internal cavity. The invention has an advantageous application for turbine engine blading and, in particular, for the vanes or stators for gas turbine aircraft engine of the outlet guide vane (OGV) type.

A core is produced having the shape of the internal cavity of the composite material vane to be produced, and comprising a reinforcing structure and a sealed envelope.

As illustrated in FIGS. 1 and 2, the reinforcing structure can take the form of a lattice and consist of an assembly of three-dimensional bars. FIG. 1 shows a core 1 comprising an envelope 10 and a reinforcing structure 11 having a lattice shape. The lattice 11 connects the inner walls of the envelope 10 at a number of points.

As illustrated in FIG. 2, an elastomer material 5 can be cast or injected inside the envelope 10 and between the elements of the reinforcing structure 11. The incorporation of an elastomer material inside the reinforcing structure makes it possible to absorb certain stresses when the core is present inside the composite material vane to be manufactured. Hence, the elastomer material 5 incorporated in the core 1 is not intended to be removed at the end of the manufacturing method of the composite material vane.

In the example illustrated in FIGS. 1 and 2, the bars of the lattice are straight and of constant cross-section. The bars can have non-constant cross-section or be curved.

As illustrated in FIGS. 3 and 4, the reinforcing structure can include portions in the shape of a shell 22. FIG. 3 shows a core 2 comprising an envelope 20 and a reinforcing structure 22.

The shell-shaped portions can be placed judiciously so as to support or reinforce particular regions of the vane. According to a particular embodiment of the invention, a prior study of the modes of vibration of the skins of the vane can be carried out in order to determine the location of the anti-nodes of the modes of vibration. Preferably, it is sought to determine the simple bending and torsion modes. Hence, the shell-shaped portions will preferably be placed orthogonally to the locations on the skins corresponding to anti-nodes.

In the example illustrated in FIGS. 3 and 4, the shell-shaped portion 22 is positioned perpendicularly to the two surfaces 2a and 2b of the core 2 intended to come into contact with the skins of the blading, which will correspond to the intrados and extrados of the vane. Hence, the reinforcing structure will be able to support and reinforce the two skins of the blading in order to limit their vibrations.

The shell-shaped portions can also be positioned in regions of the blading having the greatest thickness. In addition, the shell-shaped portions can also have an advantageous geometry from an acoustic point of view, for example for reducing noise pollution.

As illustrated in FIG. 4, an elastomer material 5 can be cast or injected inside the envelope 20 and on both sides of the reinforcing structure 22. The incorporation of an elastomer material inside the reinforcing structure makes it possible to absorb certain stresses when the core is present inside the composite material vane to be manufactured. Hence, the elastomer material 5 incorporated in the core 2 is not intended to be removed at the end of the manufacturing method of the composite material vane.

The reinforcing structure can also include solid bodies, which match the shape of a portion of the cavity of the vane. FIG. 5 illustrates a core 3 comprising an envelope 30 and a reinforcing structure, composed of a shell 32 and a solid body 33. The solid body 33 matches the shape of a portion of the envelope 30, so as to simultaneously support the two surfaces 3a and 3b of the core 3 intended to come into contact with the skins of the blading, which will correspond to the intrados and extrados of the vane.

The solid bodies of the reinforcing structure can be placed judiciously so as to support or reinforce particular regions of the vane. However, if the reinforcing structure is made of metal, it will be sought to limit the presence and size of solid bodies in the metal reinforcing structure, in order to limit its mass.

As illustrated in FIG. 6, an elastomer material 5 can be cast or injected inside the envelope 30 and on either side of the shell-shaped portion 32. The incorporation of an elastomer material inside the reinforcing structure makes it possible to absorb certain stresses when the core is present inside the composite material vane to be manufactured. Hence, the elastomer material 5 incorporated in the core 3 is not intended to be removed at the end of the manufacturing method of the composite material vane.

The reinforcing structure may comprise and combine different types of reinforcement. Hence, as illustrated in FIGS. 7 and 8, the reinforcing structure can include lattice portions, shell-shaped portions and solid bodies. FIG. 7 illustrates a core 4 comprising an envelope 40 and a reinforcing structure composed of a lattice-shaped portion 41, a shell-shaped portion 42 and a solid body 43. The lattice-shaped portions can be used in a preferred way for the portions of the core having large volumes. The solid bodies can be used in a preferred way for the portions of the core having restricted volumes.

As illustrated in FIG. 8, an elastomer material 5 can be cast or injected inside the envelope 40 and between the elements 41, 42 and 43 of the reinforcing structure. The incorporation of an elastomer material inside the reinforcing structure makes it possible to absorb certain stresses when the core is present inside the composite material vane to be manufactured. Hence, the elastomer material 5 incorporated in the core 4 is not intended to be removed at the end of the manufacturing method of the composite material vane.

As illustrated in FIGS. 1 and 2, the envelope can comprise protuberances 10a projecting from the outer surface of the core and directed towards the exterior. The goal of these projecting protuberances 10a is to ensure a mechanical attachment between the envelope and the composite material skins of the vane. These projecting protuberances 10a can be disposed in a particularly advantageous manner so as to ensure a mechanical attachment on the skins of the composite material vane having a cavity. For example, in the case of a blading, the projecting protuberances 10a will mainly be situated so as to ensure mechanical connection between the envelope and the intrados and extrados of the blading.

In the example presented in FIGS. 1 and 2, the projecting protuberances are oriented perpendicularly to the surface of the core. If the core is intended to be inserted into a fibrous preform, through a separating area for example, such projecting protuberances can hinder the insertion of the core by hooking in the fibres of the preform before the final placing of the core. Hence, according to a particular embodiment of the invention, if the core is first inserted through a first surface, the projecting protuberances will be directed in a manner opposed to said surface. Consequently, the core will be able to be inserted through said surface without the protuberances "grabbing" the fibres. When the core is correctly put into position in the fibrous preform, the projecting protuberances enable a mechanical attachment, in particular in the direction opposite to the direction of insertion of the core.

The lattice structures enable easy passage of functional elements such as cables, pipes, conduits or yarns, to the inside and through the reinforcing inner structure of the vane. On the other hand, it may be necessary to produce bores inside the shell-shaped structures or solid bodies in order to allow the passage of these functional elements of the vane.

The manufacture of a core comprising an envelope and a reinforcing structure according to the invention will now be described.

According to a first embodiment of the core of the invention, the reinforcing structure and the separating envelope are produced and then assembled.

The reinforcing structure can be made of metal. A metal with a low coefficient of thermal expansion will be preferred for the manufacture of the reinforcing structure, in order to limit the stresses inside the composite material vane. The metal of the reinforcing structure can, for example, be titanium, Inconel or stainless steel.

The metal reinforcing structure can be produced by metal additive manufacturing. The metal reinforcing structure can also be manufactured by assembling a plurality of metal portions according to conventional means. The assembly of the various portions can, for example, be carried out by welding or bonding.

The reinforcing structure can also be made of polymer or composite. The polymer for the manufacture of the structure may contain discontinuous or continuous fibres. The fibres can be glass, carbon or aramid fibres. The resin can be thermosetting or thermoplastic. Preferably, the polymer or composite reinforcing structure should be able to withstand the treatment temperatures of the composite material skins without being altered. Hence, the reinforcing structure can preferably withstand temperatures ranging up to 180° C. without being altered.

The composite reinforcing structure can be produced by composite additive manufacturing. The composite material reinforcing structure can also be manufactured by assembly of a plurality of composite material portions, for example by bonding.

The envelope can be made of metal. A metal with a low coefficient of thermal expansion will be preferred for the manufacture of the envelope, in order to limit the stresses inside the composite material vane. The metal of the envelope can, for example, be titanium, Inconel or stainless steel.

The envelope can also be made of polymer or composite. The polymer for manufacturing the envelope may contain discontinuous or continuous fibres. The fibres can be glass, carbon or aramid fibres. The resin can be thermosetting or thermoplastic. Preferably, the polymer or composite envelope should be able to withstand the treatment temperatures of the composite material skins without being altered. Hence, the envelope can preferably withstand temperatures ranging up to 180° C. without being altered.

The composite reinforcing structure can be produced by composite additive manufacturing.

The material used for producing the envelope can be the same as that used for producing the reinforcing structure.

The envelope and the reinforcing structure are then assembled according to conventional means, for example by welding or bonding.

According to a second embodiment of the core of the invention, first the reinforcing structure is produced, then the envelope is produced directly around the reinforcing structure.

The reinforcing structure can be made of metal, composite material or polymer, according to the means described above.

Similarly, the envelope can be made of metal, composite material or polymer, according to the means described above.

The envelope is, for example, produced by moulding two halves intended to be assembled in order to form the envelope. The two halves are then disposed around the reinforcing structure, then assembled to the reinforcing structure and between them in order to form the core.

According to a third embodiment of the core of the invention, the reinforcing structure and the envelope are produced in a single piece. For example, the reinforcing structure and the envelope are produced by additive manufacturing of one or more materials. Different materials can be used to manufacture the envelope and the reinforcing structure, or to manufacture the various elements of the reinforcing structure.

The reinforcing structure and the envelope can also be made of metal, polymer or of composite material. The reinforcing structure and the envelope can be made of the same material.

Once the reinforcing structure and the envelope are produced, an elastomer material can be cast or injected inside the envelope, as described above.

When the core having the shape of the internal cavity of the composite material vane has been produced, it is used to manufacture said composite material vane.

In the three embodiments of the core of the invention presented below, it is important that the surface of the core, and therefore of the envelope, is sealed. More specifically, during the method for manufacturing the composite material vane having an internal cavity, creep of the resin towards the inside of the core would increase the mass of the vane by filling the internal cavity with unwanted material.

In addition, the creep of the resin towards the inside of the core could lead to the formation of pores or dry zones in the outer composite material.

A finishing operation can be performed on the core manufactured as described above, in order to improve the surface condition or the sealing of the core. This finishing operation is particularly advantageous for cores produced by 3D printing. This finishing operation can be an annealing, a mechanical operation or chemical treatment, optionally comprising the addition of a resin film followed by curing.

Various embodiments of a vane have now been described, comprising a reinforced cavity according to the method of the invention.

According to a first embodiment of the method of the invention presented in FIGS. 9 to 11, a fibrous blank 100 intended to surround the core is produced. This fibrous blank will enable the formation of a composite material skin around the core, in other words the formation of a composite material skin around the sealed envelope of the core.

The blank 100 is obtained from a strip 101 that is woven by three-dimensional (3D) or multilayer weaving, the strip 101 generally extending in a direction L corresponding to the longitudinal direction of the vane to be manufactured. The weaving is carried out, for example, with warp yarns extending in the direction L.

A separating area 102 is formed substantially in the middle of the strip 101, over at least one part of the length of the fibrous blank 100 between the longitudinal edges 101c and 101d, between boundaries 102c and 102d. Preferably, the separating area 102 must extend at least to the transverse edges 101a and 101b. In the example illustrated in FIGS. 9 and 10, the separating area extends along the entire length of the fibrous blank 100, between the transverse edges 101a and 101b. This separating area 102 makes it possible to form an internal cavity in the fibrous blank 100, intended to allow the passage of the previously produced core.

The fibrous blank can be produced by 3D weaving with interlock weave comprising the separating area. Here, the term "interlock" weave means a weave in which each layer of weft yarns links a plurality of layers of warp yarns with all the yarns of the same weft column having the same movement in the weave plane. In known manner, the separating area is arranged between two layers of warp yarns by not passing a weft yarn through the separating area zone during binding of the warp yarn layers located on either side of the separating area.

The fibrous blank 100 comprises a plurality of warp yarn layers which are connected by 3D weaving except at the separating area 102. Outside of the separating area 102, the warp yarn layers of the blank 100 are all connected together.

In order to weave ceramic yarns, it is possible to use, in particular, silicon carbide (SiC) yarns, for example those supplied under the name "Nicalon" by Japanese company Nippon Carbon. Other ceramic yarns can be used, in particular refractory oxide yarns, such as alumina-based yarns, $Al_2O_3$, in particular for oxide-oxide type CMC materials (fibre of the fibrous reinforcement and refractory oxide matrix). Carbon yarns are preferably used for the weaving, for example for a CMC material with fibrous carbon reinforcement.

The fibrous strip can be treated in order to eliminate the size present on the fibres and the presence of oxide at the surface of the fibres, as known per se.

It is also known per se, that a thin layer of embrittlement-release interphase coating can then be formed on the fibres of the fibrous strip by chemical vapour infiltration (CVI). The interphase material is, for example, pyrolytic carbon PyC, boron nitride BN or boron-doped carbon BC. The thickness of the layer formed is, for example, between 10 nanometres and 100 nanometres in order to preserve the deformation capability of the fibrous blanks.

The fibrous strip is then impregnated by a consolidation composition, typically a carbon precursor resin or a ceramic precursor resin, optionally diluted in a solvent. The consolidation can be carried out in an oven.

According to this first embodiment of the invention, the core is introduced into the fibrous blank 100 through the separating area 102, so as to form a fibrous preform 200 as illustrated in FIG. 11. If the core possesses projecting protuberances on its outer surface, these are inserted between the yarns of the fibrous blank.

The densification of the fibrous preform 200 then takes place, by filling the pores of the preform, in all or part of the volume thereof, with the material constituting the matrix. The matrix of the composite material of the part to be manufactured can be obtained in a manner that is known per se, according to the liquid method.

A moulding step can be performed, preferably after the insertion of the core into the fibrous preform. This moulding step can reduce the expansion of the preform. This moulding step is preferably performed hot, the fibrous preform being wet or dry.

The liquid method involves impregnating the preform with a liquid composition containing an organic precursor of the matrix material. The organic precursor usually has the form of a polymer, such as a resin, optionally diluted in a solvent. The preform disposed around the core is placed in a mould that can be sealingly closed with a recess having the shape of the final moulded piece and able, in particular, to have a twisted shape corresponding to the final shape of the part to be manufactured. The mould is then closed and the matrix precursor liquid (for example a resin) is injected into all of the recess in order to impregnate all of the fibrous part of the preform.

The transformation of the precursor into organic matrix, i.e. its polymerisation, is carried out by heat treatment, generally by heating the mould, after removal of any solvent and cross-linking of the polymer, the preform always being kept in the mould having a shape corresponding to that of the structure with aerodynamic profile. The organic matrix can, in particular, be obtained from epoxy resins, such as the high-performance epoxy resin sold under reference PR 520 by CYTEC, or from liquid precursors of carbon or ceramic matrices.

In the case of the formation of a carbon ceramic matrix, the heat treatment consists of pyrolysing the organic precursor in order to transform the organic matrix into a carbon or ceramic matrix depending on the precursor used and the pyrolysis conditions. By way of example, carbon liquid precursors can be resins with relatively high coke content, such as phenolic resins, while the ceramic liquid precursors, in particular of SiC, can be polycarbosilane (PCS) or polytitanocarbosilane (PTCS) or polysilazane (PSZ) resins. Several consecutive cycles can be carried out from the impregnation up to the heat treatment, in order to achieve the desired degree of densification.

The densification of the fibrous preform is preferably performed by the well-known method of resin transfer moulding (RTM). In accordance with the RTM method, the fibrous preform is placed around the core in a mould having the external shape of the desired part. The core can perform the role of a counter-mould A thermosetting resin is injected into the internal space defined between the part made of rigid material and the mould, and which comprises the fibrous preform. A pressure gradient is generally established in this internal space between the location where the resin is injected and the orifices for removal thereof, in order to control and optimise the impregnation of the preform by the resin.

The resin used can be, for example, an epoxy resin. The resins suitable for RTM methods are well-known. They preferably have a low viscosity in order to facilitate their injection into the fibres. The choice of the temperature class and/or the chemical nature of the resin is preferably determined as a function of the thermomechanical stresses to which the vane must be subjected. Once the resin is injected into the entire reinforcement, its polymerisation proceeds by heat treatment according to the RTM method.

In this way a composite material vane is obtained having an internal cavity reinforced by a reinforcing structure and an envelope. If the envelope comprises projecting protuberances, these are inserted between the yarns of the composite material in order to create a mechanical attachment between the reinforcing structure and the portion of the composite material vane manufactured by the RTM method. The internal cavity of the composite material vane can be filled entirely or partially by an elastomer material for its damping properties.

According to a second embodiment of the method of the invention (variant not illustrated), the composite material vane having an internal cavity is produced in a known manner by layup. Hence, fibrous layers are applied on the previously produced core, in other words fibrous layers are applied on the sealed envelope of the core. The fibrous layers can be pre-impregnated with a precursor resin matrix, or can be dry strata which will be densified by a resin after layup. The fibrous layers can be one-dimensional, two-dimensional or three-dimensional weaves, provided they have a thickness allowing the layup. The fibrous layers can also be plies of long discontinuous fibres, with controlled or random distribution.

The one or more resins for impregnating layers are cross-linked by a heat treatment performed on the assembly of fibrous layers. In this way, an envelope is obtained, made of composite material around the core.

The composite material vane can also be obtained in known manner by thermocompression of ply lamination.

In this way a composite material vane is obtained having an internal cavity reinforced by a reinforcing structure and an envelope. If the envelope comprises projecting protuberances, these are inserted between the yarns of the composite material in order to create a mechanical attachment between the reinforcing structure and the composite material skins of the vane. The internal cavity of the composite material vane can be filled entirely or partially by an elastomer material for its damping properties.

The invention claimed is:

1. A method for manufacturing a turbomachine vane made of composite material and having a cavity, the method comprising:
    producing a core having the shape of the cavity of the vane to be manufactured, said core comprising a reinforcing structure occupying only a portion of a volume of the core, the reinforcing structure having, at least in part, a lattice structure, the core further comprising a sealed envelope defining the outer surface of said core, the lattice structure consisting of a three-dimensional assembly of bars connecting inner walls of the envelope at a number of points, at least one bar of the three-dimensional assembly of bars extending from one of the inner walls of the envelope to an opposite inner wall of the envelope;
    forming a composite material skin around the core, the reinforcing structure comprising at least one support element joining two opposing inner walls of the envelope, and
    studying natural modes of vibration of the walls of the cavity in order to determine a location of anti-nodes of the natural modes of vibration, the support element being positioned at one or more of the anti-nodes of the natural modes of vibration of the walls of the cavity.

2. The manufacturing method according to claim 1, wherein a volume of the remainder of the core comprises an elastomer material, so as to obtain a composite material vane having a cavity occupied by the elastomer material and the reinforcing structure.

3. The manufacturing method according to claim 1, wherein the support element is a solid body matching the internal shape of a portion of the envelope.

4. The manufacturing method according to claim 1, wherein the envelope comprises protuberances projecting towards the outside of the core.

5. The manufacturing method according to claim 1, wherein the composite material skin is produced by injecting a matrix precursor resin into a fibrous preform covering the core, the method further comprising the treatment of said resin in order to obtain a skin comprising a fibrous reinforcement densified by said matrix.

6. The manufacturing method according to claim 5, wherein the fibrous preform is produced by inserting the core into a separating area of a fibrous blank produced in a single piece by three-dimensional weaving of yarns.

7. The manufacturing method according to claim 5, wherein the fibrous preform is obtained by layup of fibrous strata around the core.

8. The manufacturing method according to claim 1, wherein the composite material skin is produced by layup of fibrous strata pre-impregnated with a matrix precursor resin around the core, the method further comprising the treatment of said resin in order to obtain a skin comprising a fibrous reinforcement densified by said matrix.

* * * * *